United States Patent Office 2,858,228
Patented Oct. 28, 1958

2,858,228
PREPARATION OF SPINNING SOLUTIONS

Harold K. Hughes, Rock Hill, S. C., assignor to Celanese Corporation of America, New York, N. Y., a corporation of Delaware No Drawing. Application September 4, 1956
Serial No. 607,576

9 Claims. (Cl. 106—190)

This application is a continuation-in-part of my co-pending application Serial No. 460,753, filed October 6, 1954.

This invention relates to the preparation of spinning solutions of cellulose acetate having a high degree of substitution dissolved in methylene chloride or mixtures of methylene chloride and lower aliphatic alcohols.

In the preparation of spinning solutions of cellulose acetate having a high degree of substitution dissolved in methylene chloride or mixtures of methylene chloride and lower aliphatic alcohols, it is the practice once the cellulose acetate has been dissolved, to filter the said solutions to remove therefrom any undissolved or incompletely dissolved materials. During the filtration and spinning of these solutions, it is necessary to move them from one point to another through conduits by the use of pumps, air pressure, or the like. With solutions having a cellulose acetate concentration of less than about 16% by weight, based on weight of the solution, no special difficulties are encountered in filtering the solution, or in moving it through conduits from one point to another. In addition, no special difficulties are encountered in spinning the said solutions as the result of spinning instability.

However, when the concentration of the cellulose acetate in the spinning solution is increased to above about 18% by weight and especially to above about 20% by weight, the properties of said solution change. The filterability of the spinning solution declines sharply so that the quantity of solution that can be passed through a given filter before it plugs is greatly reduced. Even after the spinning solution is filtered, it is found that there are still present in said solution a large number of small particles visible under certain conditions. Repeated filtration of the solution in the presence of filter aids does not sufficiently reduce the number of said particles. Spinning of the concentrated solutions into an evaporative atmosphere, e. g. heated air at a temperature of 30 to 90° C., is very difficult since the spinning instability thereof tends to cause filament breaks, as well as thick spots in the filaments, thus preventing the production of a high quality product.

It is an important object of this invention to provide a process for the preparation of spinning solutions which will be free from the foregoing and other disadvantages.

A further object of this invention is to provide a process for the preparation of concentrated spinning solutions of cellulose acetate having a high degree of substitution dissolved in methylene chloride or mixtures of methylene chloride and lower aliphatic alcohols which will have a low viscosity and good filterability and which will exhibit good spinning stability.

Other objects of this invention will be apparent from the following detailed description and claims. In this description and claims all proportions are by weight unless otherwise indicated.

According to one aspect of the present invention, a solution of cellulose acetate having a high degree of substitution dissolved in methylene chloride or mixtures of methylene chloride and lower aliphatic alcohols, is subjected to a temperature of at least about 55° C. This heat treatment results in a marked reduction in the viscosity and an improvement in the filterability of the solutions. As a result, they can be readily pumped through a conduit or the like at lower pressures, and a larger volume of the said solutions may be forced through a given filter before it plugs. The filtration of the solutions heat treated in accordance with this invention proceeds efficiently and removes from the said solutions substantially all foreign particles present therein. The filtered solutions exhibit a good spinning stability and may be converted to filamentary materials, films and the like without difficulty. The heat treatment does not cause any substantial degradation of the cellulose acetate used; thus, the intrinsic viscosity and acetyl value of the cellulose acetate are substantially unchanged by the heat treatment. The process of this invention is particularly adaptable to solutions containing at least 18% (e. g. 18–25%) of the cellulose acetate.

The cellulose acetate to which the process of this invention is applicable is that having an acetyl value of above about 58% by weight, or preferably above about 60% (e. g. 60–62.5%) by weight, calculated as acetic acid. Cellulose acetate having a lower acetyl value does not exhibit the special difficulties described above when it is dissolved in a solvent to form a concentrated solution directly.

The solvent employed in preparing the solution is either methylene chloride or a mixture of methylene chloride and a lower aliphatic alcohol, such as methanol, ethanol, normal propanol, isopropanol, or the butanols. The proportion of alcohol in the solvent may range up to about 25%, based on the total weight of the solvent.

The solution of the cellulose in the solvent may be readily carried out by adding the required amount of cellulose acetate to the solvent, either on a batch basis or, if desired, in a continuous manner. To assist in achieving a homogeneous solution, stirring means should be provided to achieve a uniform and thorough contact of the cellulose acetate with the solvent, and to break up and disperse any lumps or particles of undissolved cellulose acetate.

One convenient method of making and heat treating the cellulose acetate solution is to bring together the cellulose acetate in finely divided condition, e. g. in the form of flake, with the solvent in a vessel provided with an agitator, after which the vessel is closed and heated to a temperature of above 55° C. while agitating. Depending on the degree of subdivision of the cellulose acetate and the degree of agitation, the cellulose acetate may be dissolved in this process even before the temperature of the mixture reaches 55° C. Since the temperature of heat treatment is above the atmospheric boiling point of the solution, the pressure in the closed vessel is greater than atmospheric during the heat treatment.

In another method of carrying out this invention the solution of cellulose acetate is heat treated by passing it continuously through a heated tube, preferably at such a velocity that the flow in the tube is turbulent.

The duration of heat treatment is, of course, sufficient to effect an improvement in the filterability of the solution. The optimum times of treatment are dependent on the temperatures employed. Thus, heat treatments at 60° C. for 2 hours, at 90° C. for less than two minutes, and at 125° C. for less than one minute, have given similar results, namely a four-fold increase in the filterability as measured by the volume of the solution which may be forced through a given filter before it plugs. It will be understood that the time and temperature of heat treatment should not be such that any substantial degradation of the cellulose acetate takes place. Preferably, the heat treatment is continued until the filterability of the solution is at least doubled.

The improvement in spinning stability effected by the heat treatment of this invention is indeed marked. Thus, in one typical case a filtered solution, without the heat treatment, would spin stably for only 2 hours, whereas after heat treatment in accordance with this invention it spun stably for 60 days.

The heat treatment of this invention also has an unexpected effect which is important when the solvent or solvents used in this invention may become contaminated with small amounts of acetone. This may take place when acetone is used in the same plant as the cellulose acetate solutions employed in this invention and the acetone is drawn into the system used for recovery of the methylene chloride solvent. The presence of small amounts (e. g. 1 to 2%) of acetone results in a marked decrease in the filterability and a sharp increase in the viscosity of the solutions of cellulose acetate.

However, when such solutions containing small amounts of acetone are heat treated in accordance with the present invention the viscosity after heat treatment is substantially the same as that of a heat treated acetone-free solution and the filterability is markedly improved (e. g. by more than tenfold), although the filterability of the heat treated acetone-containing solution is not as good as that of a heat treated acetone-free solution.

Tests for measuring the filterability, or quantity of material that can be passed through a given filter before it plugs, are given in the article by Cox and Mohney in Industrial and Engineering Chemistry, volume 45, pages 1798–1803, and the article by Hermans and Bredee, J. Soc. Chem. Ind., volume 55, pages 1T–4T.

The following examples are given to illustrate this invention further.

Example I

A cellulose acetate having an acetyl value of 61.6%, calculated as combined acetic acid, is dissolved with stirring at room temperature in a mixture of 90% of methylene chloride and 10% of methanol to form a solution containing 21% of the cellulose acetate. The solution is then heated in a closed vessel, with stirring and without loss of solvent, to a temperature of 90° C. for 1.8 minutes. As a consequence of this heat treatment, the viscosity of the solution decreases from 950 poises to 551 poises and a filter passes 4 times as much solution before plugging.

The heat treated solution is filtered and then spun into a multi-filament yarn by forcing the solution at a temperature of 70° C. through a spinnerette having 40 orifices and into an atmosphere of heated air having a temperature of 35° C., in a spinning cabinet, and the yarn is taken up at a rate of 300 meters per minute on a bobbin. The spinning stability is excellent and a uniform yarn, without breaks, is produced over long periods of continuous spinning. In contrast, when the unheat treated solution is filtered and spun in an identical manner, broken and uneven filaments occur much more frequently, the average period for satisfactory spinning being only 1/1000 the corresponding average period for the heat treated solution.

Example II 40,000 parts of a mixture of 91% of methylene chloride and 9% of methanol are charged to a jacketed mixer. Thereafter 12,000 parts of cellulose acetate having an acetyl value of 61.5% are added with agitation and finally 4000 more parts of the solvent mixture are added. The mixer is then sealed to prevent evaporation and hot water is passed through its jacket to raise the temperature of the contents to 65° C. for one hour. Agitation is continued throughout the entire operation. The solution is filtered and then spun as in Example I. The heat treatment results in a manifold increase in the filterability and spinning stability.

Example III

Example II is repeated except that the amount of cellulose acetate is reduced so that the mixture initially contains 18.5% thereof. After the heat treatment, cold water is passed through the jacket while solvent vapors are drawn off from the mixer, at atmospheric pressure, until the concentration of cellulose acetate in the solution is raised to 21.4%, after which the solution is filtered and spun as in Example I. Comparison with an otherwise identical solution prepared without the heat treatment and evaporation steps shows that these steps result in a manifold increase in the filterability and spinning stability.

It is to be understood that the foregoing detailed description is given merely by way of illustration and that many variations may be made therein without departing from the spirit of my invention.

Having described my invention what I desire to secure by Letters Patent is:

1. Process for the preparation of clear solutions of cellulose acetate having an acetyl value above about 58% dissolved in a solvent, which comprises forming a solution consisting essentially of the cellulose acetate in a solvent of the class consisting of methylene chloride and mixtures of methylene chloride and lower aliphatic alcohols, heating the solution to a temperature above about 55° C., the heating being continued for a time sufficient to increase the filterability and spinnability of the resulting solution, as compared, under identical conditions, with an otherwise identical solution prepared without such heating, cooling the solution and filtering the cooled solution.

2. Process for the preparation of clear solutions of cellulose acetate having an acetyl value above about 58%, which comprises subjecting a mixture consisting essentially of the cellulose acetate with a solvent of the class consisting of methylene chloride and mixtures of methylene chloride and lower aliphatic alcohols to a temperature above about 55° C. under super-atmospheric pressure, the heating being continued for a time sufficient to increase the filterability and spinnability of the resulting solution, as compared, under identical conditions, with an otherwise identical solution prepared without such heating, cooling the solution, and filtering the cooled solution.

3. Process for the preparation of clear solutions of cellulose acetate having an acetyl value above about 58%, which comprises subjecting a mixture of the cellulose acetate with a solvent of the class consisting of methylene chloride and blends of methylene chloride and lower aliphatic alcohols, in which mixture the concentration of the cellulose acetate is at least about 18%, to a temperature above about 55° C. under superatmospheric pressure to form an easily filtered, readily spinnable solution, the mixture being subjected to said temperature for a time sufficient to increase the filterability and spinnability of the resulting solution, as compared, under identical conditions, with an otherwise identical solution prepared without such heat treatment, cooling the solution, and filtering the cooled solution.

4. Process as set forth in claim 3 wherein the heat treatment is at a temperature of about 60° C. for a period of about 2 hours.

5. Process as set forth in claim 3 wherein the heat treatment is at a temperature of about 90° C. for a period of about 1.8 minutes.

6. Process as set forth in claim 3 wherein the heat treatment is at a temperature of about 65° C. for a period of about 1 hour.

7. Process as set forth in claim 3 wherein the heating is continued for a sufficient period to increase the filterability of the resulting solution to a value of at least double that of a solution made by mixing said solvent and said cellulose acetate at room temperature.

8. Process as set forth in claim 3 wherein said solution contains a minor proportion of acetone.

9. Process for improving the properties of a solution consisting essentially of cellulose acetate having an acetyl value above about 58% in a solvent of the class consisting of methylene chloride and mixtures of methylene chloride and lower aliphatic alcohols, which comprises subjecting said solution to a temperature above about 55° C. under superatmospheric pressure to reduce the viscosity of said solution and increase the filterability and spinnability thereof, the heating being continued for a time sufficient to increase the filterability and spinnability of the resulting solution, as compared, under identical conditions, with an otherwise identical solution prepared without such heating, cooling the solution and filtering the cooled solution.

References Cited in the file of this patent

UNITED STATES PATENTS

| | | |
|---|---|---|
| 1,633,292 | Shipley | June 21, 1927 |
| 2,336,310 | Spence et al. | Dec. 7, 1943 |
| 2,447,459 | Famulener et al. | Aug. 17, 1948 |
| 2,541,012 | Bruins et al. | Feb. 13, 1951 |
| 2,739,069 | Fordyce et al. | Mar. 20, 1956 |

FOREIGN PATENTS

| | | |
|---|---|---|
| 434,970 | Great Britain | Sept. 12, 1935 |